(12) United States Patent
Clark et al.

(10) Patent No.: US 9,156,460 B2
(45) Date of Patent: Oct. 13, 2015

(54) BRAKE MONITORING SYSTEM FOR HEAVY VEHICLES

(71) Applicant: SafetyWatch Technologies, Inc., Tualatin, OR (US)

(72) Inventors: Judith Clark, Tualatin, OR (US); Bridget Taylor, Sheridan, OR (US); Robert Dexter, Tualatin, OR (US); Kent Larson, Vancouver, WA (US)

(73) Assignee: SafetyWatch Technologies, Inc., Tualatin, OR (US)

( * ) Notice: Subject to any disclaimer, the term of this patent is extended or adjusted under 35 U.S.C. 154(b) by 0 days.

(21) Appl. No.: 13/840,771

(22) Filed: Mar. 15, 2013

(65) Prior Publication Data

US 2013/0253762 A1    Sep. 26, 2013

Related U.S. Application Data

(60) Provisional application No. 61/613,844, filed on Mar. 21, 2012.

(51) Int. Cl.
*B60T 17/22* (2006.01)
*B60T 8/88* (2006.01)

(52) U.S. Cl.
CPC ............... *B60T 17/22* (2013.01); *B60T 8/885* (2013.01); *B60T 2270/406* (2013.01)

(58) Field of Classification Search
None
See application file for complete search history.

(56) References Cited

U.S. PATENT DOCUMENTS 4,800,991 A * 1/1989 Miller ...................... 188/1.11 L
7,373,224 B2   5/2008 Goetz et al.
7,877,216 B2 * 1/2011 Wright et al. .................. 702/34
2001/0035820 A1 * 11/2001 Osterman et al. ............. 340/453
2003/0222774 A1   12/2003 Koenigsberg et al.
2006/0020377 A1 * 1/2006 Goetz et al. .................... 701/29
2010/0188203 A1   7/2010 Wallace et al.

FOREIGN PATENT DOCUMENTS

WO     0229274 A1   4/2002
WO   2010003244 A1   1/2010

OTHER PUBLICATIONS

Korean Intellectual Property Office, International Search Report and Written Opinion of PCT/US2013/033188, Jul. 23, 2013, WIPO, 12 pages.

* cited by examiner

*Primary Examiner* — John R Olszewski
*Assistant Examiner* — Gerrad A Foster
(74) *Attorney, Agent, or Firm* — Alleman Hall McCoy Russell & Tuttle LLP

(57) ABSTRACT

A brake monitoring system for use on a motor vehicle includes a sensor connected to each brake actuator on the motor vehicle for monitoring the position and travel of the brake actuator and for generating and transmitting a brake condition signal; a data processor carried in an axle box associated with each axle and connected to sensors associated with brakes for the axle for receiving, interpreting, storing, and upon request, transmitting the brake condition signal, wherein each data processor includes an auto-address mechanism to identify its position on the vehicle; and a master station, wherein said master station includes a display for identifying a particular vehicle brake, a quantitative indication of the travel on the brake actuator associated with the particular brake, and wherein said visual indicating devices which are indicative of said safety condition of a particular brake.

18 Claims, 15 Drawing Sheets

```
                 Brake Timing
100 ─┌──────────────────┬──────────────────┐─ 108
     │    Left Side     │    Right Side    │
     │  1)  0.160 ─102  │  1)  0.160 ─110  │
     │  2)  0.110 ─104  │  2)  0.110 ─112  │
     │  3)  0.110 ─106  │  3)  0.110 ─114  │
     │                  │                  │
     └──────────────────┴──────────────────┘
      Home      Up         Down      Next
```

FIG. 6

```
                   Summary
      ┌────────────────────────────────────────┐
120 ──┼─ Brake Status: 0%                      │
122 ──┼─ Brake Sequence: Normal                │
124 ──┼─ Soft Brakes: 0                        │
126 ──┼─ Full Brakes: 2                        │
128 ──┼─ Time since Power-up: 0000:03 Hours    │
130 ──┼─ System Hours: 000089:15 Hours         │
      └────────────────────────────────────────┘
      Home      Up         Down      Next
```

FIG. 7

Trailer
Sensor
Bracket

BRAKE MONITOR CALIBRATION

FILE  VIEW  HELP

STEP 1:

| | LEFT SIDE | RIGHT SIDE | LIMIT |
|---|---|---|---|
| AXLE 1 | 1.249 | 1.357 | 1.750 |
| AXLE 2 | 1.334 | 1.432 | 2.000 |
| AXLE 3 | 1.550 | 1.562 | 2.000 |

STEP 2: DOWNLOAD

STEP 3: BRAKES OFF    STEP 4: BRAKES ON

FIG. 15

BRAKE MONITORING SYSTEM FOR HEAVY VEHICLES

CROSS REFERENCE TO RELATED APPLICATIONS

This application claims priority to U.S. Provisional Patent Application No. 61/613,844, entitled Brake Monitoring System for Heavy Vehicles, filed Mar. 21, 2012, the entirety of which is hereby incorporated by reference for all purposes.

FIELD

The present description relates to systems, methods and apparatus for brake monitoring systems for heavy vehicles, including trucks and buses.

BACKGROUND AND SUMMARY

Vehicle brakes, such as vehicle brakes for heavy vehicles, such as trucks, tractor-trailer combinations and buses, must be inspected and maintained. Degradation and failure of the brakes may result in catastrophic events. As such, the Federal Department of Transportation (DOT) has issued standards to insure that brakes are properly adjusted and operable to stop the vehicles if need arises.

Large vehicle brakes are inspected at check points, such as weigh stations. With such checks, a driver, operator or inspector may crawl under the truck to inspect the travel of the actuator arms to insure compliance with federal and state regulations. Typically the inspection must be done for each brake on a vehicle. In some inspection systems, the driver may have to operate the brakes during the inspection such that the driver stays in the cab of the truck while the inspector visually checks each brake.

Further, under standard practice, it is recommended that drivers/operators perform a brake inspection as part of the normal daily routine before commencing a day's driving. However, because of the difficulties in performing a brake inspection such daily inspection are often not performed. The failure to perform the daily brake inspection is further a result of the difficulties in performing the inspection without the assistance of another.

Brake monitoring systems have been developed previously. As an example, prior systems have attempted to monitor air pressure to determine if the brakes are operating safely. In other systems, a warning is provided after the brake travel has exceeded legal limits. Further, other systems have been developed to provide a visual indication during the visual inspection. The necessity of visual inspection for each brake results in a number of difficulties, including difficulties in obtaining sufficient inspections, failure to fully inspect due to time and effort, etc.

A further system is described in U.S. Pat. No. 7,373,224 directed to a dedicated master station. It should be appreciated that the disclosure of U.S. Pat. No. 7,373,224 is hereby incorporated by reference for all purposes.

However the inventors herein have recognized that such prior systems fail to address multiple and dynamic axle configurations. Further, in contrast to prior systems, the current system provides indication of failed modes. Specifically, in the prior system, a master station could be configured to display the status of each brake with multiple colored lights. Once the brakes were released, the lights for normal brake travel would extinguish, except for marginal or out of limit brakes. Under normal conditions, the system lacked ability to display normal brake-travel. For instance, if a data collector failed, there would be no indication on the Master Station. The operator would have no indication of this failed mode, as no lights would illuminate.

Further, it is noted that the prior systems depended on sensors that were not commercially available and had to be built and manufactured to the design and environmental specifications. Similarly, the prior systems typically relied on modifying the brake pedal to attach an additional sensor to detect pedal activity. This brake pedal modification would require additional long term maintenance, and ran the risk of interfering with normal braking operations.

The present embodiment disclosed herein provides systems and methods for communicating information related to qualitative assessment of the brake system. The qualitative assessment of the brake system may include monitoring of brake travel within set limits. In addition to brake travel, the system may be useful in monitoring the timing of brake system. Such assessment may be used to diagnose air leaks in a vehicle and correct sequencing of the air valves. It should be appreciated that the correct sequencing of a truck's air valves determines the quality of braking. If air valves are not sequencing properly, the truck will need a longer distance within which to stop (sopping power may be exponentially affected depending on the number of air valves not sequencing properly). Depending on which air vale is not functioning and then how many are not functioning, the entire braking system may ultimately jackknife the truck. Air valves sequencing properly assures that the truck will brake straight and in a manner expected.

The disclosed embodiments further provide improved graphical display, industry standard communications and reliable sensors. Moreover, the system is adjustable to accommodate brake systems of different stroke travel. There are numerous versions of drum brakes, each with a specific maximum travel, or stroke. In the disclosed embodiments, system configurations are provided for the type of brake on the vehicle by axle.

As described herein, this system provides reliable readout of all axles, giving the operator the assurance that the system is monitoring all brakes. The Display Unit of the present disclosure is easy to operate, and at first glance, communicates the overall condition of the brake system before embarking on the road. Such communication provides for proper maintenance of the vehicle brake system. As one example, an inspector may take their typical measurements and cross check with the operator regarding the display numbers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 6 shows another example user interface including brake timing according to an embodiment of the present disclosure.

FIG. 7 shows another example user interface including summary information according to an embodiment of the present disclosure.

FIG. 15 provides an example interface of a Brake Monitor Calibration according to an embodiment of the present disclosure.

DETAILED DESCRIPTION

Figure 1:
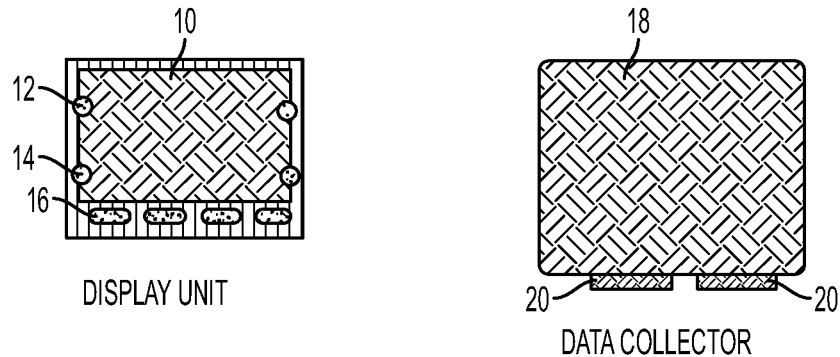
FIG. 1 is an illustration of the Display Unit and Data Collector according to an embodiment of the present disclosure.

As described in more detail below, a brake monitoring system for use on a motor vehicle is provided. The brake monitoring system includes a sensor connected to each brake actuator on the motor vehicle for monitoring the position and travel of the brake actuator and for generating and transmitting a brake condition signal and a data collector carried in an axle box associated with each axle and connected to sensors associated with brakes for the axle for receiving, interpreting, storing, and upon request, transmitting the brake condition signal. In one example, each data collector includes an auto-address mechanism to identify its position on the vehicle. The system further includes a display unit (also referred to as an onboard display) or a master station, wherein said master station includes a display for identifying a particular vehicle brake, a quantitative indication of the travel on the brake actuator (or brake actuator shaft) associated with the particular brake, and visual indicating devices. The visual indicating devices are indicative of said safety condition of a particular brake. In some examples, the on-board display may provide both graphical information and numeric data regarding the percentage of the brakes out of service.

Although the primary intended use of this invention is on large trucks and tractor-trailer combinations, it should be appreciated that the invention is also suitable for use on all vehicles which have independent brakes for each wheel, such as vehicles which generally incorporate an air-brake system. These brakes must be properly adjusted in order properly to function. Various standards have been set by state governments and the Federal Department of Transportation (DOT) to insure that brakes are properly adjusted and are therefore operable to stop these heavy vehicles when the need arises.

One standard that has been set by the DOT is a requirement that the travel of an actuator rod, which extends from a brake air cylinder to an activation arm on the brake mechanism, have a travel distance of two inches or less, depending on the brake type. A brake is deemed to be out of adjustment if the activation arm travel is two or more inches.

Newer vehicles have self-adjusting brakes. It is estimated that, at this time, approximately fifty percent of the vehicles on the road have such self adjustors. Even with the self-adjusting brakes, the slack adjustors, as they are known in the trade, will sometimes fail to operate or will become inoperative as a result of the build up of petrochemical products, dirt, or ice in the slack adjustment mechanism, which allows brakes to be out of adjustment. Older vehicles do not have any self-adjustment mechanism. Regardless of whether the vehicle is equipped with slack adjustors or not, it is a requirement that the driver physically inspect the brakes on the tractor and trailer(s) to insure that they are properly adjusted and are properly operating. As might be expected, this task is not always performed, particularly in inclement weather conditions as the task requires an outdoor under-vehicle type inspection and may be messy. Further, even with proper inspection, it is possible that the automatic slack adjusters may fail due to expansion or other forces. As such, these automatic slack adjusters, being a mechanical type device may break at any time regardless of when the last inspection took place. If, however, a brake is determined to be out of adjustment, it may be quickly adjusted by the truck operator, with a minimal expenditure of energy and with the use of a few hand tools.

Vehicle brakes are inspected at check points, such as the familiar weigh stations which are found along highways. As in the case of the driver, an inspector must generally crawl under the truck to inspect the travel of the actuator arms to insure that they are in compliance with federal and state regulations. Such inspection must be done for each brake on the vehicle, which generally requires that the driver remain in the truck and operate the brakes while the inspector visually checks each brake mechanism. Further, prior systems typically require two people to test the brakes. As disclosed in more detail herein, the present system provides a method and device where the brakes can be monitored by the operator without the need for a second person to assist. The operator or mechanic can sit in the vehicle and review the system information provided by the onboard display.

A number of monitoring devices have been provided for use on trucks. Some of these monitor air pressure to determine if the brakes are operating safely, others provide a warning only after the brake travel has exceeded legal limits, while still others provide a purely visual indication which still requires the operator to visually check every brake on the truck.

There have been a few attempts to build and market such systems in the industry, however, all known systems suffer from one or more serious defects. Some require extensive and expensive modifications to the vehicle and brake system, others are difficult or inconvenient to use, and still others are not readily adaptable to the wide variety of axle configurations found on modern trucks.

What is needed then is an automatic brake-travel monitoring system that is simple and reliable, easy for the operator to use, is inexpensive to install and maintain, and is readily adaptable to various axle configurations. The disclosed brake monitoring system herein provides a simple and reliable, easy for the operator to use, inexpensive system to install and maintain, and is readily adaptable to various axle configurations. The disclosed brake monitoring system provides increased safety by ensuring that the adjustment of the brakes is identified in time to alert an operator. Inspections are simplified further advancing safety by ensuring proper maintenance indicators are identified.

Further, failures due to a combination of brakes being out of adjustment can be identified through the disclosed monitoring system to reduce safety risks. For example and not as a limitation, identification of a steer axle brake out of adjustment may put a truck out of service. Further, the value of the other brakes out of adjustment may be 20% where exceeding this 20% may put a vehicle out of service. The system may monitor each brake to ensure adjustment is within the safety range and that the combination of the brakes remains within the safety range.

As discussed below, components of the system, include, but are not limited to the Display Unit, the Data Collector and Sensors.

As shown in FIG. 1, the Display Unit and the Data Collector are provided to enable communication of brake status to an operator. The Display Unit provides a user interface adapted to convey immediate information to an operator. In the illustrated example, the Display Unit may include a screen or display, such as, but not limited to, an electronic Liquid Crystal Display (LCD) screen 10. The display, may provide visual indicators, such as Light Emitting Diodes (LEDs), which displays brake specific information. For example, and not as a limitation, Green LEDs 12 may be used to convey system status, Red LEDs 14 may be used to signal warning and Out-of-Service conditions. Further the Display Unit may further include user input devices. For example, there may be buttons or other inputs linked to the display to enable an operator to select and operate the brake management system. In the illustrated embodiment, and only as an example, 4 buttons 16 are shown located on the Display Unit. It should be appreciated that number of buttons or inputs may be provided. Further, the screen may be a touchscreen with integrated inputs.

In some embodiments, the Display Unit may be considered a Master Station. The Display Unit provides a graphical display that concisely summarizes and presents the brake results. As provided in the examples below, the brake sensor information may be displayed in tabular form or graphical form. For example, the Display Unit may provide information regarding the percentage or amount that a brake is out of service. By providing alphanumeric numbers or graphic displays, an operator may be able to address an out of compliance issue. Such displays may increase the operator's awareness much more than a simple on/off indicator light and provides information to enable an operator to address safety issues as they arise. Such displays may even be useful for operators suffering from dyslexia or other condition. As one example, the graphical display may allow the operator to scroll through the list of axles, for example, an operator may scroll through a list of axles, such as five or more axles if there are more than five axles on the vehicle. It should be appreciated that other vehicles may have any other number of axles monitored. The foot print of the Display Unit is small such that it fits into more locations within the cab. The graphical display provides simplified viewing of brake information.

FIG. 1 further illustrates a Data Collector. The example Data Collector is adapted to be positioned or located near each axle and is configured to monitor the sensors to determine the brake adjustments. In the illustrated embodiment, the Data Collector is in an enclosed unit 18 with no operator access. One or more connectors 20 may connect the Data Collector to power, sensors and communications. As used herein, it should be appreciated that the sensors may be sensor pairs. Specifically, in some embodiments the sensors are two per axle or one for each brake (and thus sensor pairs). Further, in some embodiments, the system may also include additional sensors on the drop axles to determine if the drop axles are raised or lowered. If the drop axles are lowered, then the stroke status of the drop axle brakes may also be included in the determination of Out-of Service (OOS) through the monitoring system described herein. If the drop axles are raised, then they would not be counted in the axle count for determination of OOS as adjusted by the presently-disclosed monitoring system.

As noted above, the Data Collector may be linked with one or more brake monitoring sensors or sensor pairs. The link between the Data Collector and sensors or sensor pairs may be any suitable communication link, including a wired link, a wireless link, etc. As an example, each Data Collector may use the brake light wire to detect when a brake event is in progress. Sensing the brake light wire for brake events, removes the need to modify the brake pedal itself. Availability of the brake signal can be tapped into anywhere on the vehicle or trailers.

In addition to brake travel, another useful datum which may be monitored is the time it takes for the brake to reach the maximum position during the brake event. With this information, a mechanic may determine that the brake system has an air leak or a sticky air cylinder. The brake timing displayed by the system can also reveal or show air-valve sequencing and Crack Pressure sequencing anomalies. As noted previously, failures in timing/air valve sequencing (failure to sequence properly) contributes to jackknifing of a vehicle. The timing to avoid the failed condition must have the last axles of a trailer be the first to be activated if the air valves are sequencing properly. Thus, the sequencing of the air valves, if accurate, will take place with the last brake on the last trailer then sequence forward from axle to axle. As an example, if the steer axle brakes activate first or any of the drive axles on the truck activate first, the power of these braking components may force the trailer to swing around and jackknife. By providing a system that monitors the sequencing of the air valves (and air leaks, etc.) it may be possible to avoid a failure due to improper air valve sequencing.

It should be noted that other parameters may further be monitored within the system. For example, the system could also provide an indication of the parking brakes being set. In such embodiments, the system may determine that the drive axle brakes may be applied while neither the front axle brakes nor trailer brakes are applied. In this manner, the system may determine that the parking brakes are applied. As disclosed in more detail herein, a display may provide information on the monitoring system. For example, a readout of the brake stroke based on the parking brake may be displayed and may further be useful to a technician or mechanic.

Figure 2:
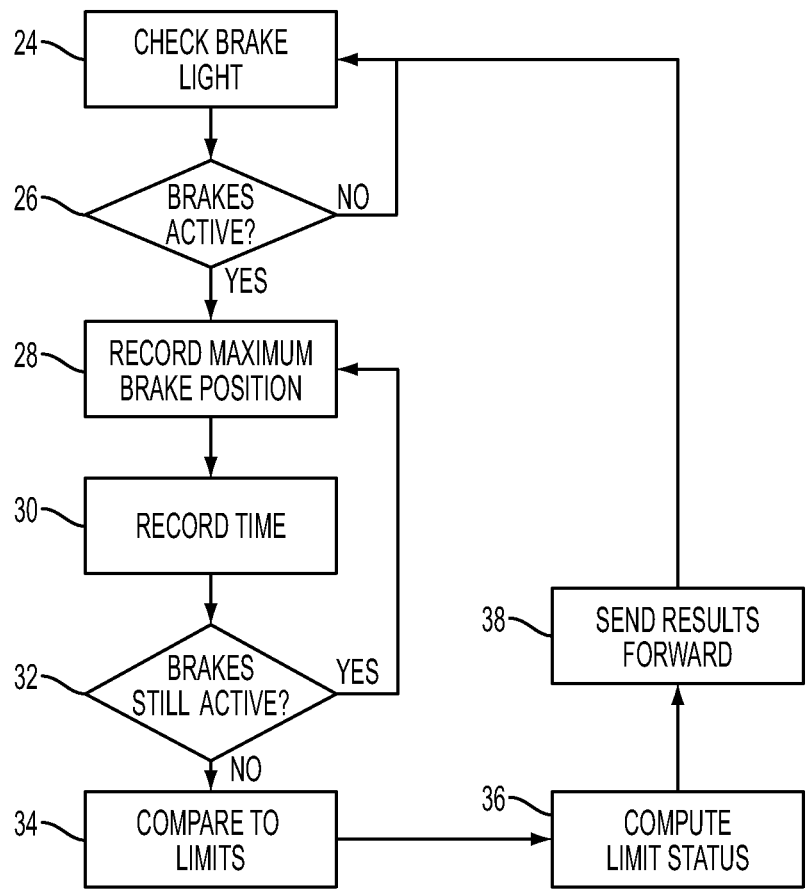
FIG. 2 shows a process flow depicting brake position information according to an embodiment of the present disclosure.

Turning now to FIG. 2, the process of collecting readings from the brake sensors is illustrated. In the disclosed example, the Data Collector may wait until a brake event begins. For example, the brake event may be determined by monitoring a Brake Light 24. In other examples, the brake event may be determined with messages over the communications bus.

A loop causes the Data Collector to wait for brakes at 26 (are brakes active?). If the brakes are not active, then the process returns to step 24 (loop back to the beginning). If the brakes are active, then the process moves to step 28 where the maximum position of the brakes are recorded.

For example, in one embodiment, once the brakes are being applied, then the Data Collector begins collecting sensor samples and retains the maximum readings reached 28. During this event, the Collector is also recording the time it took to reach the maximum position 30. This timing information is bundled with the brake readings to be sent forward at the end of a brake event. The collection of data continues during the brake event by checking that the brakes are still being applied 32. Once the brake event has concluded, the sensor reading is converted to a measurement and compared to the limits 34 as defined for that brake assembly.

Within each Data Collector may be stored the operating parameters for determination of the brake adjustments. Once the limits are checked, then a response is formed regarding the status of the brake. In one example embodiment, the system provides at least four parameters: brake identification, brake reading, brake status and finally the timing parameter. It should be appreciated that other systems may employ additional or different combinations of these parameters. Returning again to FIG. 2, the step in the flow diagram at 36 may determine the value of the status flag. The brake status is an indication of stroke. As an example, it is either in limits, out by one-eighth or out by one-fourth. Finally the results are put into messages and sent over the communications bus provided.

Once the loop is complete, the Data Collector is ready for another brake event.

The Data Collector is communicatively linked to the Display Unit. In one example, the Display Unit (FIG. 3) would be located in the cab of the vehicle for the operator to view.

Figure 3:
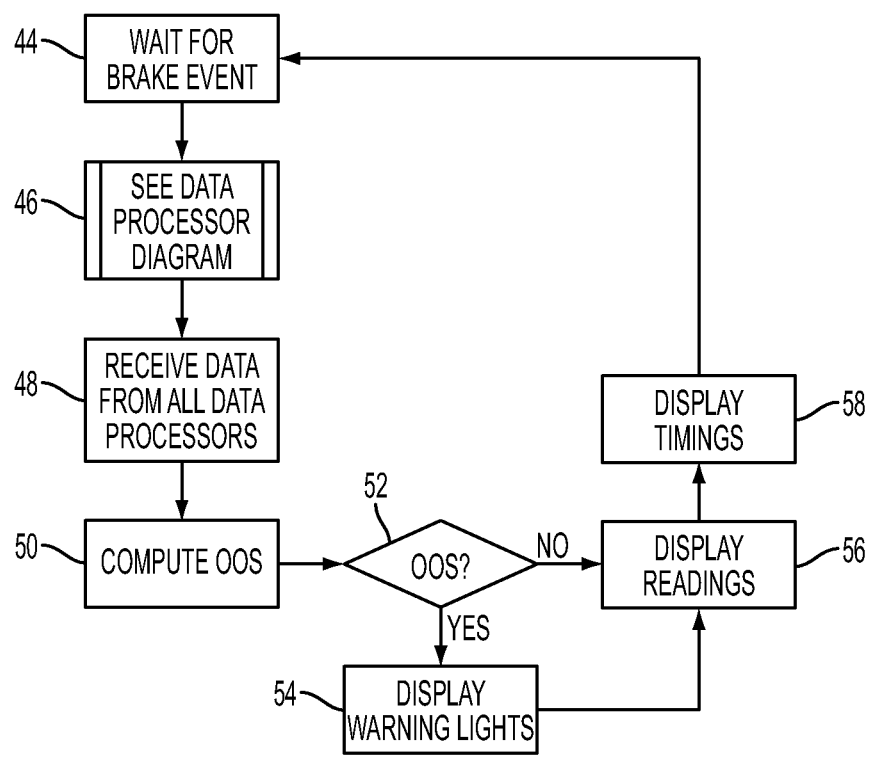
FIG. 3 shows a process flow depicting display of brake event information according to an embodiment of the present disclosure.

For example, the Display Unit may be used to monitor the front axle. A Data Collector may be operatively coupled for monitoring the front axle. For example, FIG. 3 provides an illustration of operation and display of brake monitoring information when the Display Unit is operatively connected or linked to the sensors of the front axle.

For example, at 44, the Display Unit may wait for a brake event. At 46, the processor gathers and assimilates brake and sensor data. As such, the method begins by waiting for a brake event 44. Once the brakes are applied, then the Display Unit performs a similar flow as defined by the Data Collector in FIG. 2. At the conclusion of a brake event, the Display Unit is ready to receive data 48 from the front axle with data received from Data Collectors located over the remaining axles. Once all information is compiled, the Display Unit determines the Out-of-Service (OOS) 50. This is done by comparing the number of brakes that are out of adjustment to the number of axles on the vehicle. If the system is in OOS 52, then, in one example, the display Red LEDs will flash, indicated at 54. The data may be formatted for both the Graphical Screen and the Tabular Screen 56. In some embodiments, the timing will be formatted to the Timing Screen 58. Additional data may extracted from the readings and presented as requested by the end user.

It should be appreciated that the Display Unit provides the results of the last brake event. The graphical representation of each brake provides easy-to-read brake information regarding whether a brake is near their limit violations. Further displays of the measured linear distance each actuator moved during a brake event and the time the brake took to achieve the maximum position may be displayed.

In some examples, the display unit may be considered to have a two-fold role. For example, the display unit may display the status of the vehicle's brake adjustment and monitor the front axle. In such examples, during a brake event, the display unit will perform the process and communicatively receive the brake information from the data collector for the front axle. At the conclusion of the brake event, the display unit may receive messages from all data collectors and compute the percentage of brake actuators as a total level of conformance to safe operating parameters.

Figure 8:
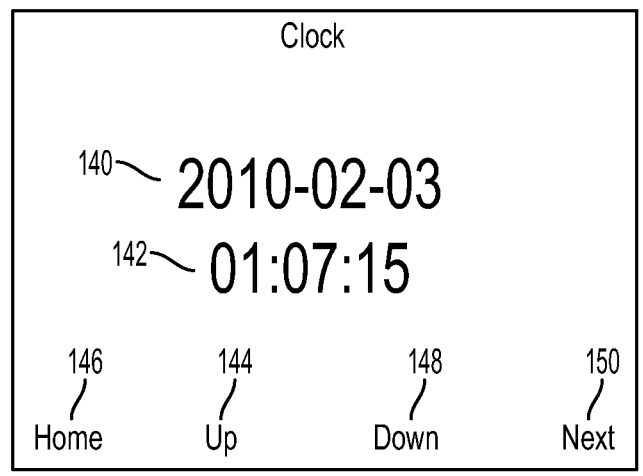
FIG. 8 shows another example user interface including system clock information according to an embodiment of the present disclosure.

The Display Unit may include a number of user interfaces. As examples and not as a limitation, based configuration screens may include, but are not limited to Graphical Screen (FIG. 4), Tabular Screen (FIG. 5), Timing Screen (FIG. 6), Summary Screen (FIG. 7) and Clock Screen (FIG. 8).

Figure 4:
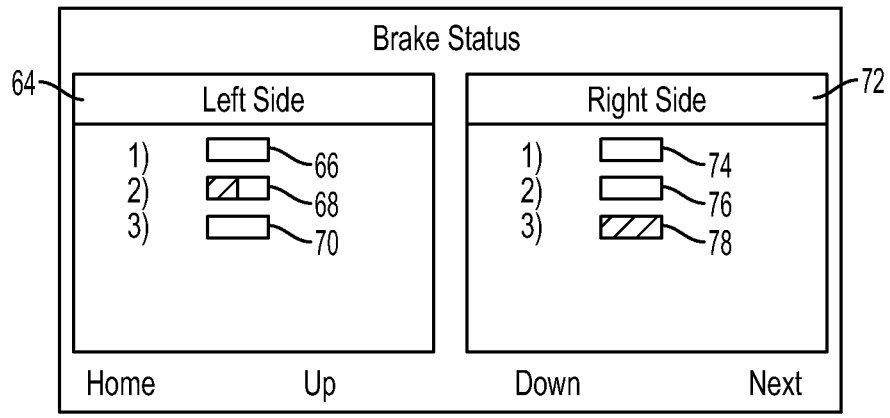
FIG. 4 shows an example user interface according to an embodiment of the present disclosure.

Turning first to the Graphical Screen shown in FIG. 4, information regarding monitored brakes is illustrated. As an example, the Screen provides the measured results of each brake. Although other formats are possible without departing from the scope of the disclosure, in an example format, the screen is divided into two halves; the Left Side 64 and the Right Side 72. The brake reading shows up as a rectangle. This is a simple rendering of the limit status. If the brake is adjusted within limits, it is shown as an empty rectangle 66, 70, 74 and 76. If a brake is out of limits by one-eighth, then it is shown as a rectangle that is half filled 68. If the brake is out of adjustments by one-fourth, then it is shown as a filled rectangle 78. The example screen shows three axles. The number of axles shown is a factor of the size of the display. A larger display may accommodate more axles. If there are more axles than room to display, then the buttons can be used to scroll through the list of axles. Numeric indexes are used to indicate the axle number.

In one example, the Graphical Screen may be the home screen such that the Graphical Screen is displayed when the system is turned on. Further, the Graphical Screen may also be presented, in some systems, whenever the Home button is pressed. In some embodiments, the Display Unit may automatically cycle through various screens, including, but not limited to the Graphical Screen.

The Graphical Screen is the main indication of the OOS for the vehicle. Other displays may also be used for off-loading the brake information, including, but not limited to hand-held terminals, connected either directly or wireless. System status information may further be transmitted to weight stations as a pass by, or linked to central dispatcher for fleet management.

Figure 5:
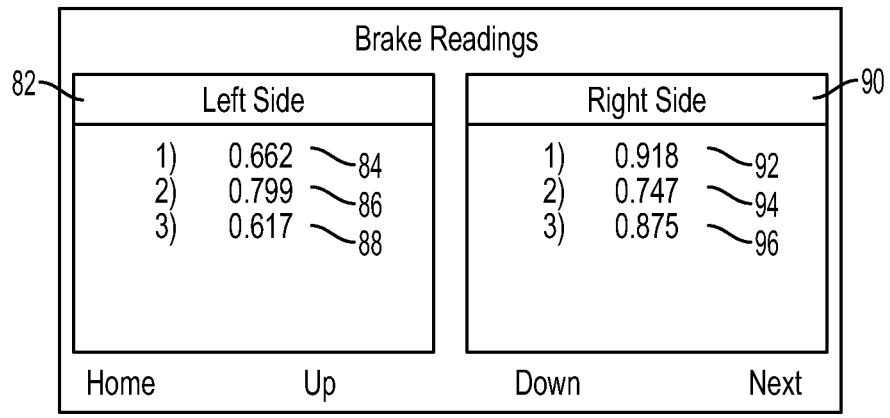
FIG. 5 shows another example user interface including brake readings according to an embodiment of the present disclosure.

FIG. 5 provides another illustration of an example user interface, the Tabular Screen. As with the other user interfaces, the format and display of the screen may vary and the disclosed format is provided as an example and not as a limitation. Specifically, in the illustrated example, FIG. 5 shows a screen divided into Left Side 82 and the Right Side 90. Each brake of the left side is shown to the left of center 84, 86 and 88. Each brake of the right side is shown to the right of center 92, 94 and 96. Numeric indexes are used to indicate the axle number. The brake reading information includes a display of the distance traveled by each brake as a result of a hard brake event. These values may be used by a Service Technician, inspector or operator. Like the Graphical Screen, it may be possible for a user to scroll to show more axles than can fit onto a single screen display. Again, it should be appreciated that the display elements are provided as an example and not as a limitation.

The Timing Screen of FIG. 6 follows the Tabular Screen with numeric readout of the travel times of the brakes. In the illustrated example, the screen is divided into Left Side 120 and Right Side 128. The information shown in the Timing Screen includes an indication of how long each brake took to reach its maximum position, as shown in the Tabular Screen. The full monitoring of the brake system may include verifying the relationships between the brakes as the timing across the vehicle indicates the balance of the braking system. For example, the operator may compare the left side to the right side 102 to 110, 104 to 112 and 106 to 114. The timing information, for example, could also provide indication of the braking sequence from back to front of the vehicle. This may be useful in determining proper Crack Pressure. Like the previous screens, it may be possible for a user to show more axles than can fit onto one screen. Numeric indexes are used to indicate the axle number.

The Summary Screen of FIG. 7 follows the Timing Screen with a collection of information that pertains to general system performance. The information shown, but not limited to, is the Brake Status (OOS) 120 and Brake Timing Status 122. Other information available for display may include, but is not limited to, a count of how many times the brakes have been or were applied softly 124, and hard 126. It can also show how long the system has been up 128 (power to the vehicle) and how many hours the brake monitoring system has been on total 130. If more information is available, Up and Down buttons may be used to scroll.

As another example user interface, the system may provide a real time clock display as in FIG. 8. The clock display may will the current date 140 and the current time 142. As shown in this figure, the input buttons may be included on the Display Unit and in some systems may be labeled electronically near the bottom of the various user interface screens. For example, in some embodiments, the buttons are the Home button 146, the Up button 144, the Down button 148 and the Next button 150. These buttons may be available from any screen. The Home button may be used to return to the first screen (in this case the Graphical Screen); the Next button may be used to cycle through the available screens. The Up and Down buttons may be used when there is more information to display that can fit onto the screen.

Figure 9:
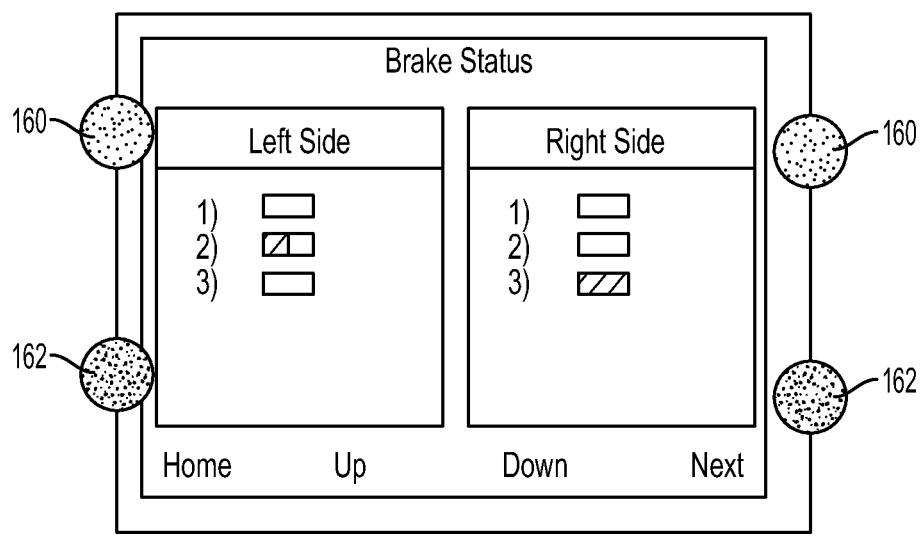
FIG. 9 shows another example user interface including brake status information according to an embodiment of the present disclosure.

As discussed briefly above, the Display Unit may include user alerts, such as visual alerts, for example Light Emitting Diodes (LEDs), to convey the status of the brake system. Other user alerts including audio or combination audio and visual alerts may be provided in other embodiments. As a first example, in FIG. 9, LEDS may be mounted in the bezel of the Display Unit. For example, Green LEDs 160 may be mounted on each side on the upper half. Red LEDs 162 may be mounted on each side on the lower half. For OOS failures, the Red LEDs may flash to gain the attention of the operator. The vehicle should not be operated while in this condition.

The user alerts may also provide information regarding where the timing on brake movement is deemed to be excessive. For example, where the timing on brake movement is deemed to be excessive, both the Green and Red LEDs may flash alternately. This condition may not restrict the use of the vehicle. That determination regarding whether use restriction of the vehicle is necessary may be determined by service personnel.

It should be appreciated that the current systems provides opportunities for adjusting the operating parameters of the brake types and ranges. An operator or mechanic may configure the system to record further brake monitoring data including information on how many brake events can be recorded for retrieval, logging brake events, capturing all sensor readings to analyze brake behavior. Further, depending on the use, the system may be configured to restrict access to the configuration setting or set-up settings such that enforcement bodies can reliably check the data. Thus, although a number of user interfaces are illustrated, it should be appreciated that other user interfaces may be selectively provided for administrators or mechanics while other interfaces may be used by the operator of the vehicle.

Figure 10A:
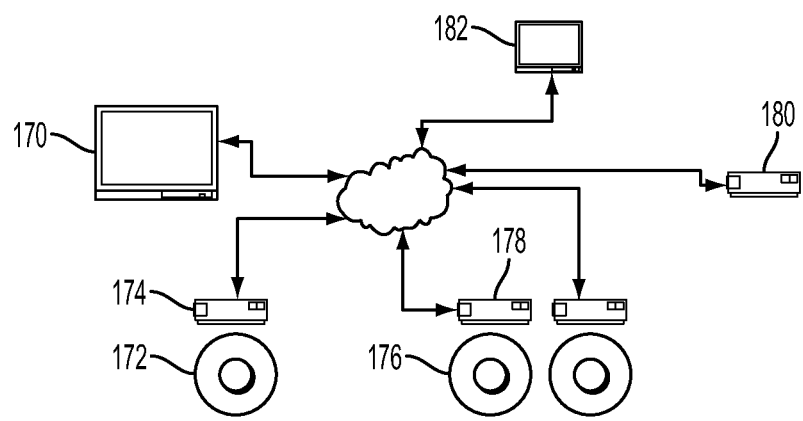
FIGS. 10A and 10B are schematic illustrations of a network and communication linkages for the brake monitoring system according to embodiments of the present disclosure.

As discussed above, a vehicle may be equipped with one Display Unit and one Data Collector for each drive axle and trailer axle (when present). Based on capacity of the Data Collectors, each may be able to monitor two axles. In FIG. 10A, example locations of the Display Unit and Data Collectors are shown, in relation to what they monitor and how they are connected. For example, the Display Unit 170 may be in the cab for the operator. If it is not to monitor the front axle 172, then the positioning of Data Collector 174 will monitor the front axle. The drive axle(s) 176 may consist of one or more axles. Data Collectors 178 will be located close to the axles, to keep the cables from the sensors short. If there are one or more trailers, so equipped with the Data Collectors 180, they would be connected to the same communications network that permits the previous components to communicate. Communications may also be accomplished by employing daisy chains, whereas each Data Collector has two communication ports, one dedicated to receive information from the previous Data Collector towards the rear of the vehicle, and one port to pass accumulated information on to the next Data Collector or Display Unit towards the front of the vehicle.

During installation of maintenance, a Mobile Computer 182 may be connected to the vehicle through the same network. Although in some embodiments, the mobile computer 182 may not be connected during actual daily operation of the vehicle, in some examples, applications may be developed to aid in the analysis of the brake system or to link in communications with the Data Collectors and/or the Display Unit.

Figure 10B:
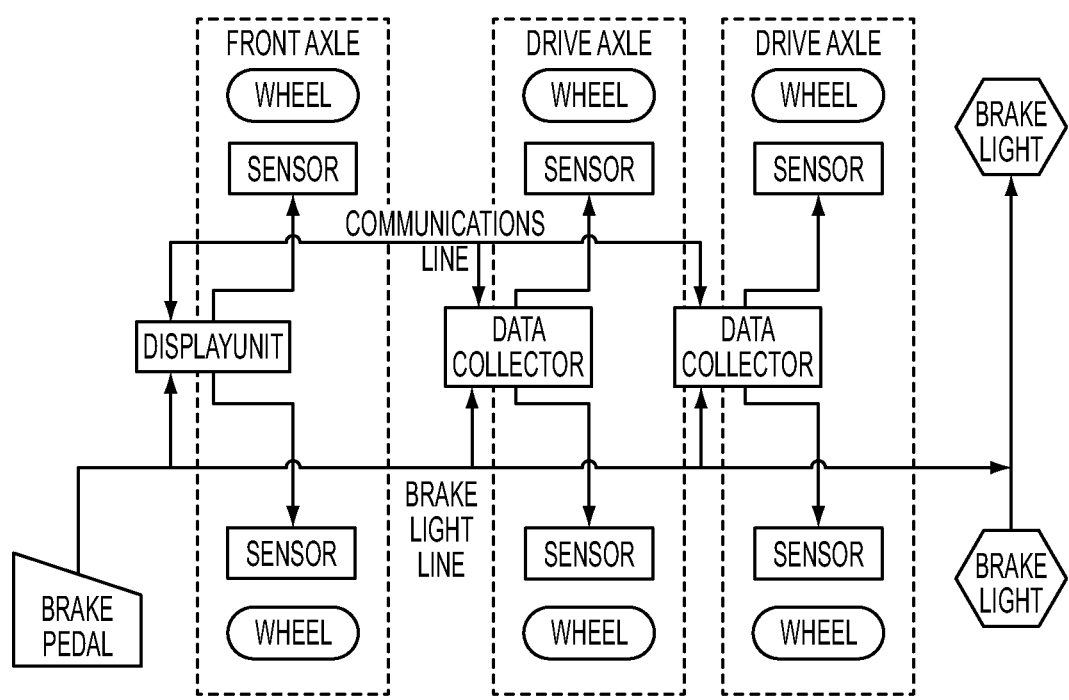

FIG. 10B provides another example of communications between the sensors, the data collectors and the display units. As an example, and not as a limitation, rear axles may be monitored by installed data processors, or data collectors. For example, each component may monitor two or four sensors. Thus, the data collectors may support two axles or four brakes.

Each component may further be connected to vehicle power. Further each unit may be connected to the brake light wire. The connection to the brake light wire enables indication of the start and duration of a brake event. In some examples, all units may be connected to a common communications line to permit sharing of results to the display unit. It should be appreciated that additional data processors may be used to cover other axles. Trailers may be configured with data processors, also referred to herein as data collectors, as well and pass data through an umbilical cord between the tractor and trailer with the results being added to the display unit.

Figure 11A:
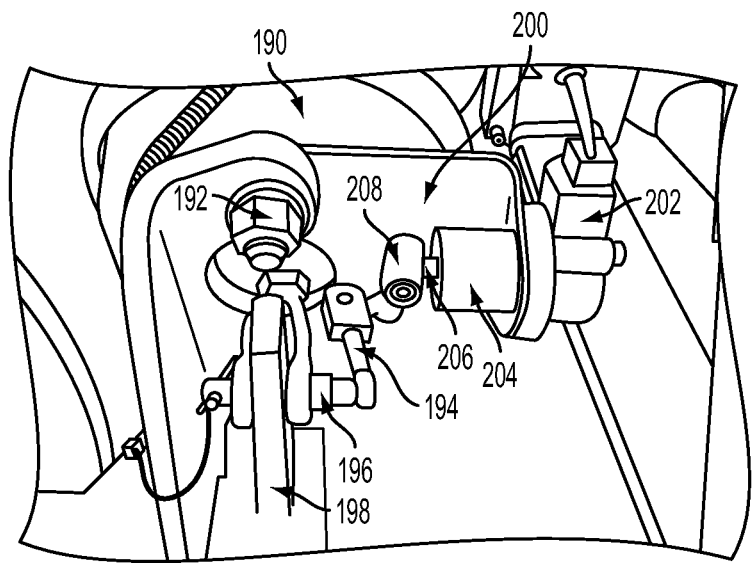
FIG. 11A is an illustration of the sensor mounting according to an embodiment of the present disclosure.

FIG. 11A provides an actual view of sensor assembly, specifically a sensor mounting. The sensor assembly provides brake sensor information to the Data Collector for display by the Display Unit. Original hardware installed on the vehicle include the Air Cylinder 190, which when pressurized will move the Actuator 198, which in turn engages the brake shoes (not shown). During system installation, the Sensor Mounting Bracket 200 will be mounted in front of the Air Cylinder 190 using the existing Mounting Bolts 192. The Sensor 202 is attached to the Sensor Mounting Bracket 200. The Sensor 202 is coupled to the Sensor Housing 204 which encloses the Sensor Shaft 206. The Sensor Shaft 206 extends the reach of the Sensor 202. Mated to the Sensor Shaft 206 is the Sensor Arm 208. At the end of the Sensor Arm 208, the Sensor Linkage 194 connects the Sensor Arm 208 to the Actuator 198. This final connection is made by replacing the existing Clevis Pin 196 with one made to receive the Sensor Linkage 194.

Figure 11B:
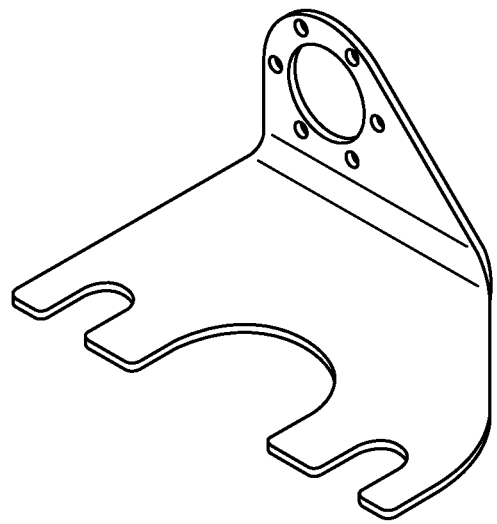
FIG. 11B is a perspective view of an example right side sensor bracket according to an embodiment of the present disclosure.
Figure 11C:
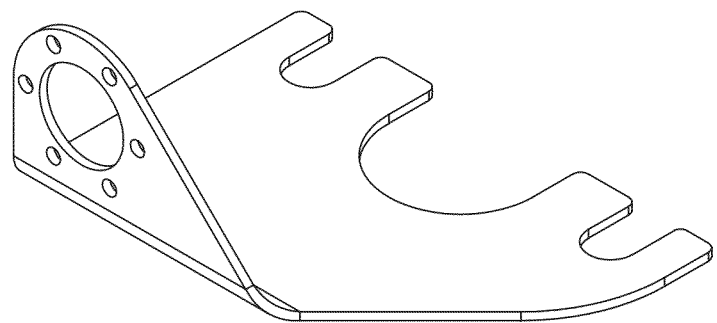
FIG. 11C is a perspective view of an example left side sensor bracket according to an embodiment of the present disclosure.
Figure 11D:
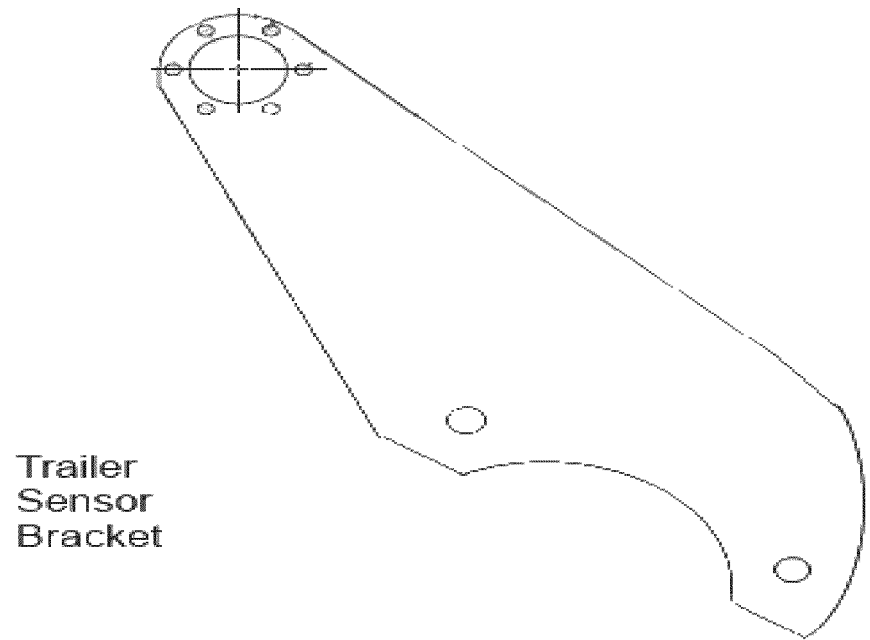
FIG. 11D is a perspective view of an exemplar trailer sensor bracket for a trailer brake.

FIGS. 11B, 11C and 11D provide additional detail of example components for the sensor assembly. As shown, FIGS. 11B and 11C provide perspective views of the right and left side sensor brackets. FIG. 11D provides an exemplary trailer sensor bracket for a trailer brake. It should be appreciated that other configurations are possible without departing from the scope of the disclosure.

Figure 11E:
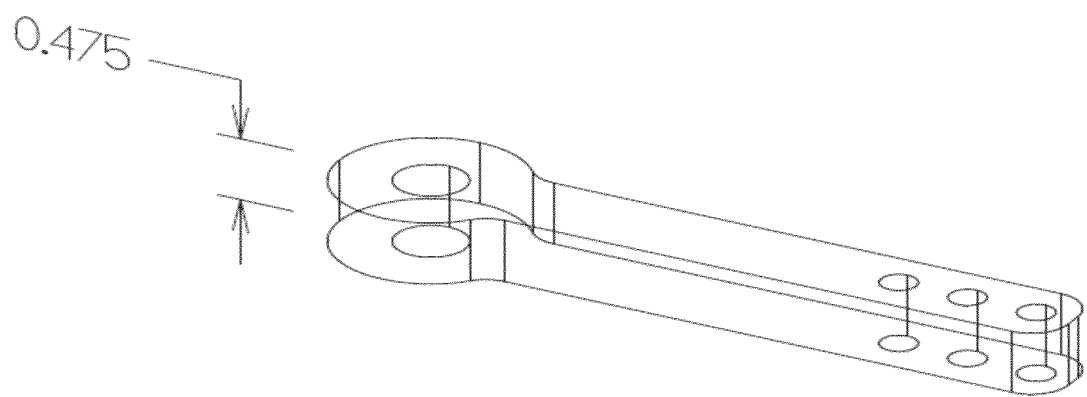
FIG. 11E is a perspective view of an actuating lever of a sensor arm according to an embodiment of the present disclosure.
Figure 11F:
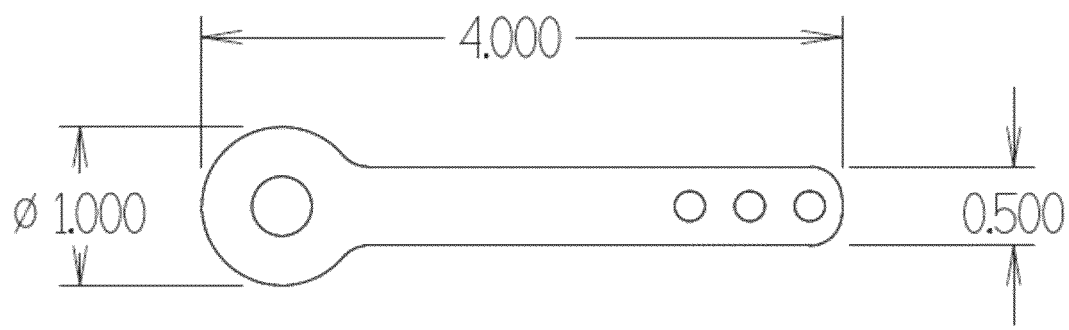
FIG. 11F is a top view of the actuating lever of FIG. 11E.

FIGS. 11E and 11F provide illustrations of example actuating levers for the sensor arms. It is noted that the dimensions shown throughout FIG. 11 are for example purposes only to show relative sizes and are not intended to limit the size or dimension of the arms or other components. Other sizes and shapes are considered and are within the scope of the disclosure.

Figure 11G:
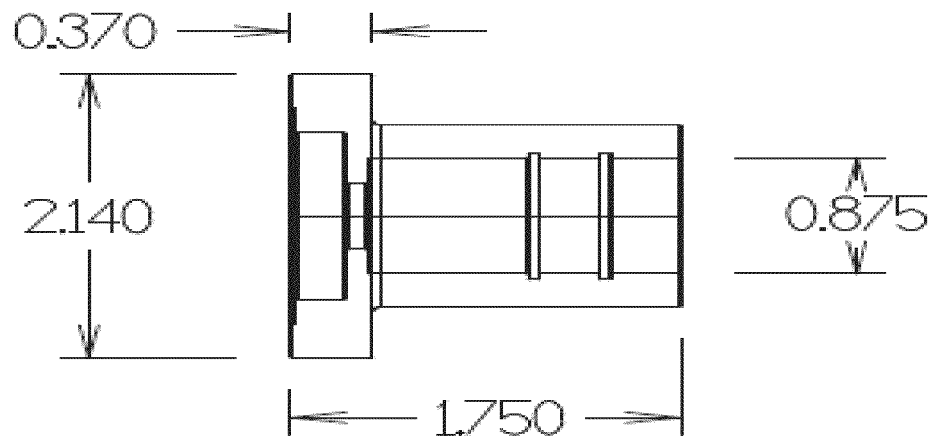
FIG. 11G is an illustration of an exemplar housing according to an embodiment of the present disclosure.
Figure 11H:
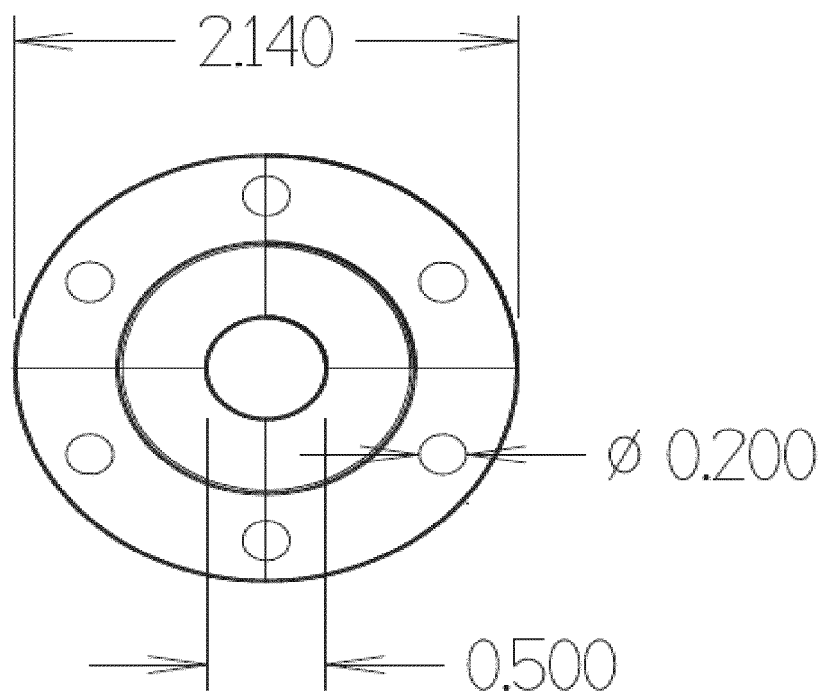
FIG. 11H is an illustration of an housing holes to attach to the sensor according to an embodiment of the present disclosure.
Figure 11I:
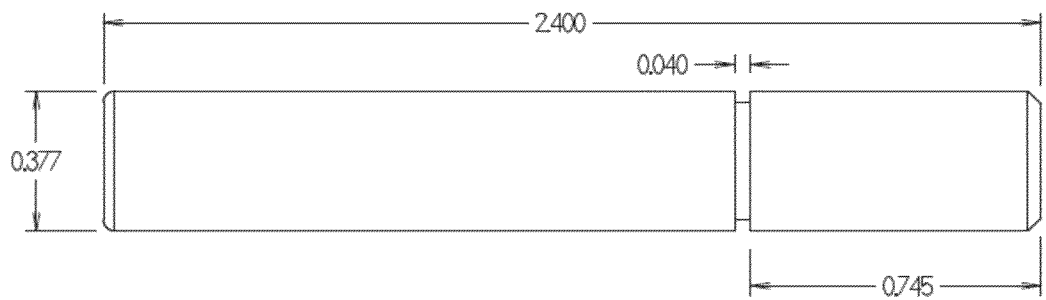
FIG. 11I is an illustration of a sensor pin according to an embodiment of the present disclosure.

FIG. 11G is an illustration of an exemplar housing and FIG. 11H is an illustration of the housing holes to attach to the sensor and provide support for the sensor pin (FIG. 11I). In one example embodiment, the sensor mates to the housing on the mounting bracket (shown in FIGS. 11B, 11C and 11D). The pin may be inserted through the housing into the sensor. The actuating level is then clamped to the other end of the pin and linked to the slack adjustor. The housing may include bearings for the sensor pin to rotate on. In some embodiments, a fastener, such as an e-clip or other device, may be used to lock the pin inside the housing.

When the brake pedal is depressed, air is driven into each Air Cylinder 190. As the chamber inside the cylinder expands, its push rod (labeled in FIG. 12) will apply torque on the end of the Actuator 198. The Actuator 198 rotates to engage the drum brake itself (not shown). As the Actuator moves, it pulls on the Sensor Linkage 194, which in turn, causes the Sensor Arm 208 to rotate. As the Sensor Arm 208 is secured to the Sensor Shaft 206, the Sensor Shaft 206 will drive the Sensor 202 directly.

Sensor 202 is an active sensor, designed to output a signal that is proportional to its rotational position. In this configuration, the Sensor 202 is translating the rotational movement into an electrical signal that is fed to the Data Controller. Other sensor types may provide linear motion and measurement directly. Sensors may also be passive in nature, such as a variable resistor. As used herein, the Brake sensors are inexpensive, robust and reliable and are configured to sense the position of the brake slack adjustor. The sensors are adapted to provide a contiguous readout over the full range of brake movement. It should be appreciated that the signal provided by the sensor is preferably immune or substantially immune to electrical noise.

In contrast to prior monitoring systems, the sensors used herein are adapted to the harsh under-carriage environment. Long life performance sensors are adapted to enable a continuous performance. Example sensors include, but are not limited to, linear actuators, proximity sensors and magnetic sensors.

It is further noted that in some prior systems the sensing of a brake event was to use a sensor place behind the brake pedal. However, this position runs the risk of failure and possible hindrance of the brake pedal. In contrast, the present disclosure provides use of the sensor along the existing brake light wire to determine when the brakes are applied.

The sensor is configured to supply an electrical signal over the entire range for which it moves. In this example embodiment, the system requires the sensor to report its position with any amount of brake pressure being applied. It should be appreciated that other similar sensors adapted to identify brake pressure may be used without departing form the scope of the disclosure.

Figure 12:
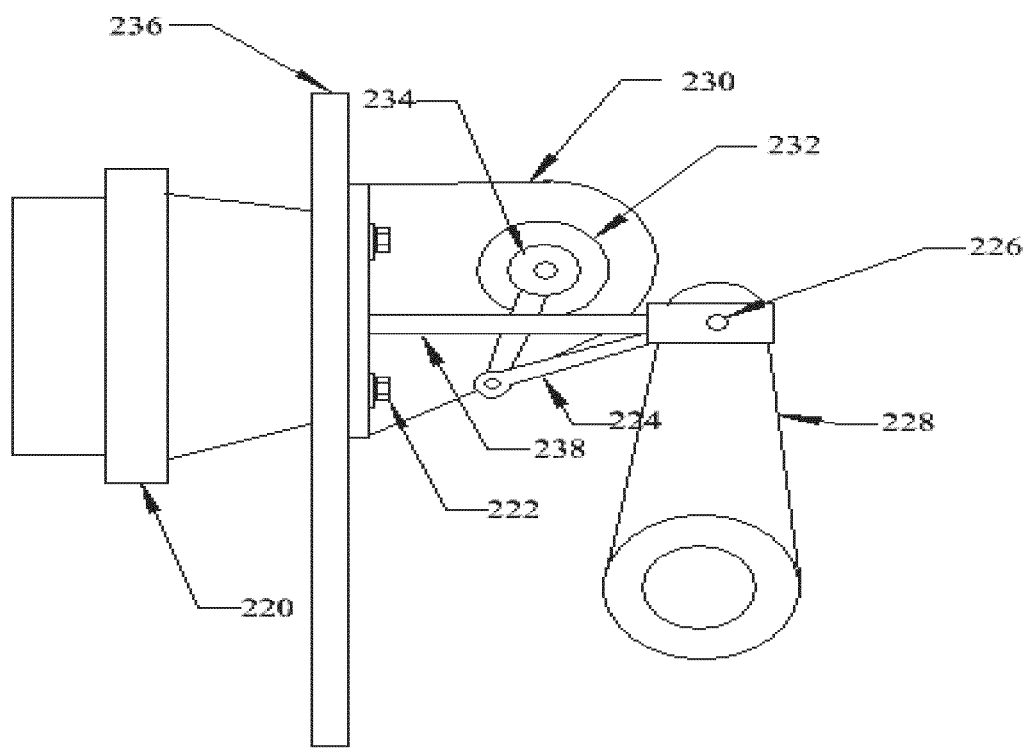
FIG. 12 is a schematic illustration of the sensor mounting according to an embodiment of the present disclosure.

A further schematic view of an example sensor assembly is provided in FIG. 12. The existing hardware shown is mounted on the vehicle Frame 236. Such hardware components include the Air Cylinder 220 on the one side and the Push Rod 238 as it is connected to the Actuator 228. The Sensor Mounting Bracket 230 is placed under the same Mounting Bolts 222 that secures the brake assembly to the vehicle. The Sensor 232 may be held in place on the Sensor Mounting Bracket 230. The Sensor 232 may be connected mechanically to the Actuator 228, by way of the Sensor Arm 234 and Sensor Linkage 224. The Sensor Linkage 224 connects to the Actuator 228 at the point of the Clevis Pin 226. For further illustration of one embodiment, components 220, 222, 228, 236 and 238 may be maintained as part of the vehicle with installation components 224, 230, 232 and 234 installed. In some embodiments, clevis pin 226 (or other fastener) may be removed from the standard vehicle equipment and replace with one supplied as part of the installation.

As the Actuator 228 is pushed over by the Push Rod 238, it pulls the Sensor Linkage 224 that causes the Sensor Arm 234 to rotate. The Sensor 232 provides the electrical signal that represents its position.

Figure 13:
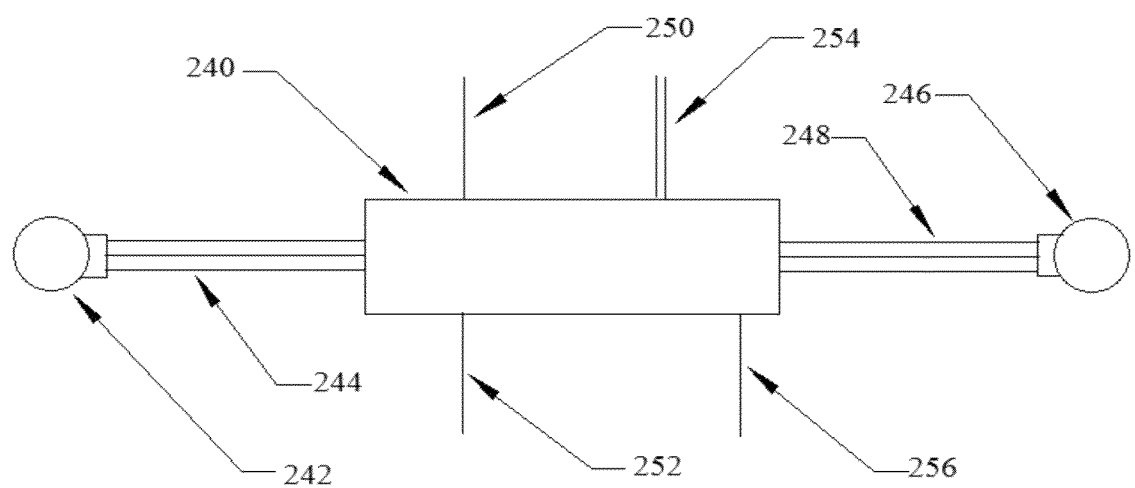
FIG. 13 is a schematic illustration of the data collector and display unit connections according to an embodiment of the present disclosure.

The connections between the Data Collector and the Sensors (Sensor Assembly) are shown in FIG. 13. Similar connections may also apply to the Display Unit. The Data Collector/Display Unit 240 requires Power 250 and Ground 252. As an example, the Data Collector may be connected to the Left Sensor 242 through Cable 244 and to the Right Sensor 246 through Cable 248. The Data Collector or Display Unit also ties into to the vehicle Brake Light Wire 256. In this example, the component may connect to the rest of the system by way of the Communications Bus 254.

The Sensor Cables 244 and 248 route power and ground to the Sensor 242 and 246 and provides a path for the Sensor signal back to the Data Collector 240. The Data Collector is positioned between the two brakes on the vehicle frame at a point where both Sensors 242 and 246 can be connected to the Data Collector 240.

During operation, as one example, the Data Collector 240 senses the level of the voltage on the Brake Light Wire. When the brakes are applied, a voltage is applied to the Brake Light wire 246 to turn on the brake lights mounted on the rear of the vehicle. When this happens, it signals the Data Collector or Display Unit 240 to begin the process of collecting sensor readings. The sensor signals enter the Data Collector through the Sensor Cables 244 and 248. The sensor readings are processed as defined in FIG. 2 and FIG. 3.

Figure 14:
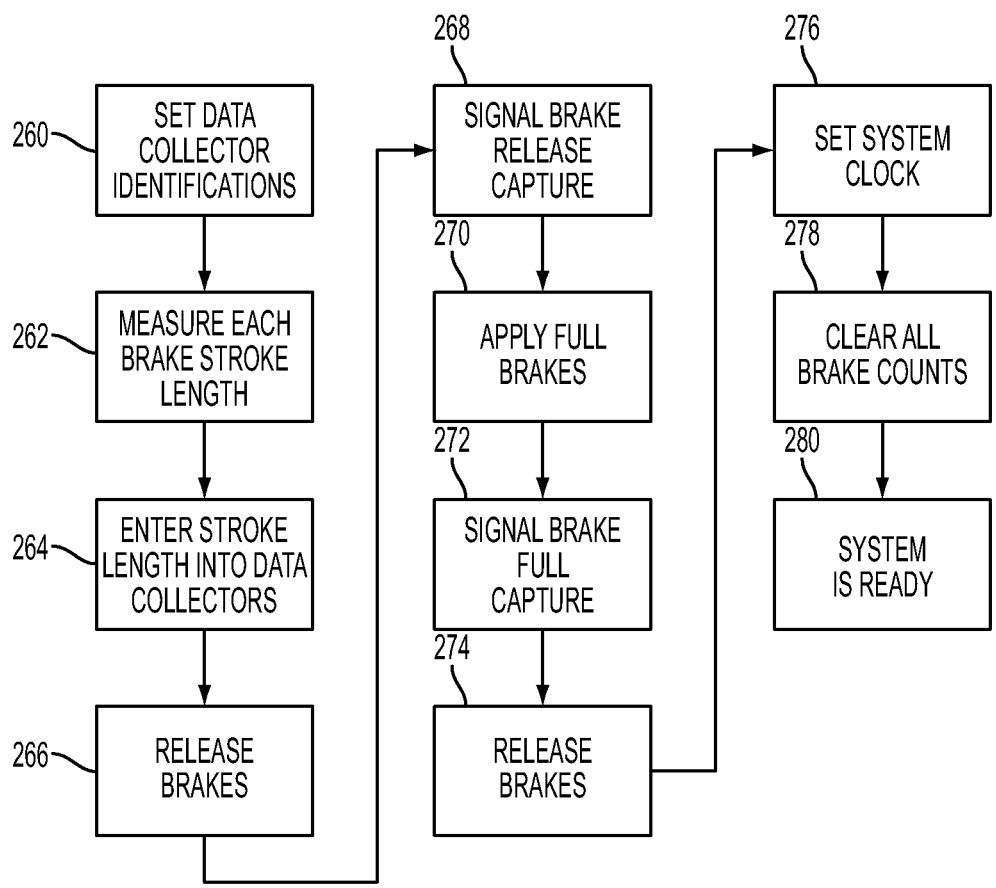
FIG. 14 shows a process flow depicting an example calibration process according to an embodiment of the present disclosure.

As shown in FIG. 10A, in some embodiments, a Mobile Computer 182 may be connected to the communications network. With the Mobile Computer 182, the system can be configured for normal operation. The flow of calibration is shown in FIG. 14. After the Mobile Computer is connected, the Data Collectors may be configured for Identifiers and Brake Types 260. For example, in some embodiments, before the system can be calibrated, the physical measurements of each brake must be made manually by trained personnel 262. The system may be informed of the brakes readings while the brakes are released and when they are fully engaged. For example, to ensure that the brakes are released 266, in one embodiment, during calibration with the Mobile Computer, the system is signaled such that that the brakes are released and readings captured 268. Full brake pressure 270 may then be applied. The air supply must be fully charged. With full brake pressure, the Mobile Computer may be used to signal the system to capture full brake readings 272. The brakes may be released 274. If the System Clock has not been set before, it can be set now 276. If desired, all brake event counters may be cleared 278. At this point, the calibration is complete and the system is ready 280. As a final step, the installer verifies the brakes are functional and that the brake lights are operational. As the need arises, other features, as added, may need a calibration or setup.

It should be appreciated that calibration software for the system can be used with, but not limited to a computing device or laptop provide by a support center. Alternatively, in some embodiments, calibration software may be used with a kiosk or station located next to the vehicle that is being repaired or inspected.

Turning to another example, FIG. 15 provides an illustration for calibrating the brake monitoring system. As a non-limiting example, calibration may be completed in one embodiment in four exemplary steps. Before starting, the physical measurements for each brake, while engagement may be recorded, along with its upper limit (determined by the type of brake it is).

Step 1: Enter the measured brake stroke for each axle, left and right side. Enter the limit in the third column.

Step 2: Press the Download button. This will update all controllers with the particular information.

Step 3: While the brakes are released, press the Brakes Off button. This will instruct all collectors to record sensor value while the brakes are off.

Step 4: Apply the brakes and press Brakes On button. This will instruct all collectors to record the sensor value while the brakes are full on.

Following the above steps, the system may be ready for use.

As described above, the current system provides improved brake monitoring systems including data presentation, use of non-standard sensors, data communications and configuration. For example, in contrast to prior systems where the display or Master Station was hard-wired for one format, the current system allows for electronic display to format and present the data differently and more readable. The information can be targeted to different viewers like operators or service personnel. Such displays give greater flexibility to present data in formats best suited to the application.

Further, in contrast to prior systems which current system uses communication techniques such as CAN bus, CANOpen, J1939, etc. Communication systems between the data collector and display unit must be able to withstand the harsh, dirty environment. By using such communications systems, the network is expandable, easily configured and resistant to transient noise. For example, in some systems, alternative communications, such as analog voltage level may be difficult to execute due to the environment and noise. For example, such communication systems are subject to severe disturbances from surrounding electrical systems. To avoid this difficulty, one or more industry communication links may be used alone or in combination. It is noted that wireless may also play a role in this with connections to properly equipped trailers, mobile computers, equipped law enforcement or government agencies.

The wireless application may provide monitoring data to a number of delivery ports. These delivery ports may be a mobile phone or other computing device. The delivery ports may be linked or connected with the operator, a vehicle administrator, a company, or a safety or inspection board. Applications may be utilized at these data ports using the data from the monitoring system to prepare trend reports, current status reports, etc. The operator or administrator may select to review the data in a number of forms, through graphical presentation, based on historical data or in comparison to other data from other vehicles.

As a further non-limiting example, additional features may be provided on some system embodiments. For example, the system may include the downloading of new firmware or software, the uploading of brake activity, service logs and/or current status. Historical data may be retrieved based on preset conditions. The application may also be used to set the real time clock or reset the brake event counters.

It should be appreciated that the brake monitoring system may be used in a number of environments as described above, including but not limited to operator on-road review, inspection stations, maintenance centers, repair centers, etc. Further, the brake monitoring system may be added to maintenance training center and air brake training equipment to train and demonstrate how it works. The data readouts may be utilized by each group depending on the need to review the current and/or historic records regarding the brake system status.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring, nor excluding, two or more such elements.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A brake monitoring system for a heavy vehicle, the brake monitoring system comprising:
   a brake sensor configured to collect brake sensor data by outputting a signal proportional to a rotational position of a sensor within a sensor housing, wherein the brake sensor includes a sensor linkage configured to operatively link the sensor to an actuator of a brake at a clevis pin connection of the actuator such that actuation of the actuator changes the rotational position of the sensor within the sensor housing;
   a data collector for collecting brake sensor data during a brake event, wherein the data collector is selectively calibrated with one or more brake adjustment parameters specific to a brake of the heavy vehicle in which the data collector is installed; and
   an on-board vehicle display unit having a plurality of user interfaces, where the user interfaces are configured to graphically display one or more of brake adjustment status, brake timing for a side-to-side comparison from a left side of the vehicle to a right side of a vehicle and from back to front.

2. The brake monitoring system of claim 1, further comprising user alerts.

3. The brake monitoring system of claim 2, wherein the user alerts indicate safe operating conditions of an air brake system by determining Out-Of-Service condition.

4. The brake monitoring system of claim 1, wherein the user interfaces display an indication of a travel on a brake actuator associated with a particular brake.

5. The brake monitoring system of claim 1, wherein the user interfaces display a graphic percentage of compliance level.

6. A method of monitoring brake status, the method comprising:
  collecting brake sensor data during a brake event with a brake sensor including:
    a sensor mounting bracket mounted in front of a vehicle brake air cylinder,
    a sensor disposed in a sensor housing, and
    a sensor arm coupled to a sensor linkage, where the sensor linkage is operatively linked to a clevis pin connection of a vehicle brake actuator such that actuation of the vehicle brake actuator during the brake event causes a change of the rotational position of the sensor within the sensor housing,
  communicating the brake sensor data to an on-board display; and
  displaying on an on-board display an alphanumeric display of the brake sensor data.

7. The method of monitoring brake status of claim 6, the method further comprising;
  recording maximum brake position; and
  comparing brake sensor data to maximum brake position.

8. The method of monitoring brake status of claim 6, further comprising:
  displaying on an on-board display a side-to-side comparison from left side of the vehicle to the right side of the vehicle.

9. The method of monitoring brake status of claim 6, further comprising:
  determining the brake timing for each brake; and
  displaying on an on-board display a side-to-side comparison from left side of the vehicle to the right side of the vehicle.

10. The method of monitoring brake status of claim 6, further comprising:
  calculating brake status percentage; and
  displaying on an on-board display the brake status percentage.

11. A brake monitoring system comprising
  a brake sensor comprising:
    a sensor mounting bracket mounted in front of a vehicle brake air cylinder,
    a sensor disposed in a sensor housing,
    a sensor arm coupled to a sensor linkage, where the sensor linkage is operatively linked to a clevis pin connection of a vehicle actuator such that an actuation of the vehicle actuator causes a change of a rotational position of the sensor within the sensor housing and,
    wherein the brake sensor is configured to output brake sensor data as a signal proportional to the change of the rotational position of the sensor within the sensor housing,
  a data collector communicatively linked to the brake sensor to collect brake sensor data; and
  an on board display communicatively linked to the data collector to display brake sensor data.

12. The brake monitoring system of claim 11, wherein movement of the actuator pulls on the sensor linkage to cause the sensor arm to rotate.

13. The brake monitoring system of claim 11, wherein the sensor detects the position of the brake slack adjustor.

14. The monitoring system of claim 11, wherein the sensor is disposed along the existing brake light wire.

15. The monitoring system of claim 11, wherein the data collector is linked through a network to the sensor.

16. The monitoring system of claim 11, wherein the sensor indicates sensor position to the data collector.

17. The monitoring system of 11, wherein the data collector is configured to detect a voltage on a vehicle brake light wire.

18. The monitoring system of claim 17, wherein the detection of the voltage on the brake light wire signals the data collector to collect brake sensor data from the brake sensor.

* * * * *